Dec. 31, 1940. W. H. SMYERS 2,226,589
METAL COATING AND ADHESIVE THEREFOR
Filed May 12, 1933
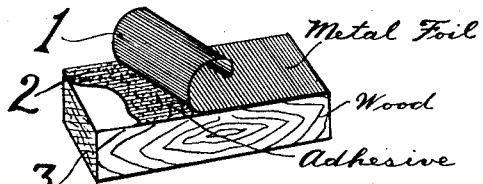
Fig.-I
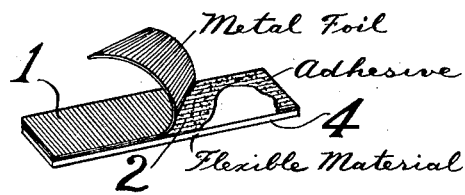
Fig.-II
Fig.-III
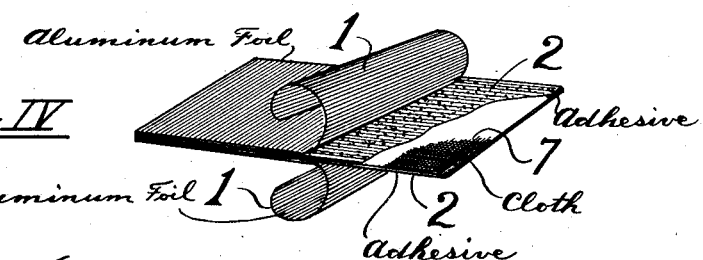
Fig.-IV
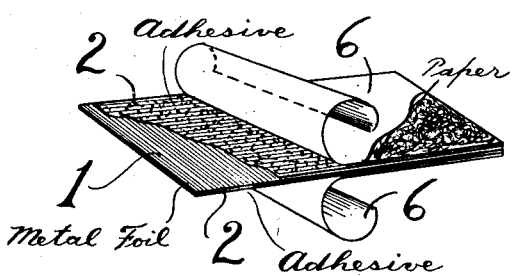
Fig.-V
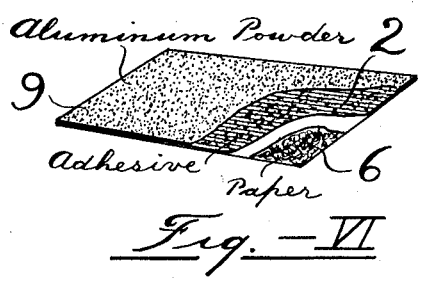
Fig.-VI
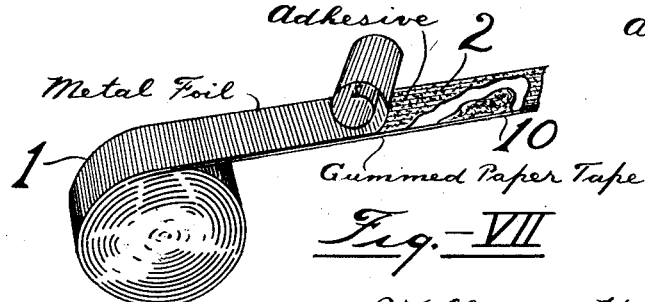
Fig.-VII
William H. Smyers Inventor
W. E. Currie Attorney Patented Dec. 31, 1940

2,226,589

UNITED STATES PATENT OFFICE 2,226,589

METAL COATING AND ADHESIVE THEREFOR

William H. Smyers, Westfield, N. J., assignor to Standard Oil Development Company, a corporation of Delaware Application May 12, 1933, Serial No. 670,730

14 Claims. (Cl. 154—46)

This invention relates to metal coatings and methods of producing same and more particularly to a new adhesive or binder for preparing flexible laminated metal foil products and the like.

Many of the common adhesives will not adhere satisfactorily to a smooth polished metal surface, especially when the metal surface is flexible and is subject to occasional bending to and fro. Many of the adhesives become hard and inflexible; some of them deteriorate and crack or have objectionable color or odor or are not sufficiently moisture-proof for many uses.

According to the present invention, a new type of material is used. This material, recently discovered, makes an ideal adhesive in that it is practically free from all of the objections noted above. This new type of adhesive is made by polymerizing hydrocarbons to a high molecular weight whereby a tough, plastic, flexible and adherent material is produced. Although iso-olefin hydrocarbons having an olefine linkage such as isobutylene, iso-amylene, and the like are used as starting materials, yet the final product has a relatively low content of unsaturated linkages. Generally the polymerization should be carried out to a molecular weight of 800 or 1000 up to considerably higher molecular weights such as 10,000 or even 15,000 or more; the higher the molecular weight the stiffer and tougher will be the finished product. It is also desirable to carry out this polymerization at low temperature (and preferably below 0° C.) in the presence of a suitable catalyst for such polymerization at low temperature. Boron fluoride has been found very suitable although other catalysts (such as aluminum chloride, antimony trifluoride, etc.) might be found satisfactory if the conditions of operation are carefully controlled. As one specific example, isobutylene is polymerized in the presence of boron fluoride at a temperature of —50 to —60° C. carrying out the reaction until a molecular weight of about 4,000 is reached.

Another method of preparing this same type of product is to polymerize the stabilizer bottoms obtained from cracked petroleum oils as described in co-pending application of P. K. Frolich, Serial No. 674,546, filed June 6, 1933.

Other alternative methods are the production of an alkylated resin such as alkylated polystyrol or the product obtained by polymerizing ethylene dichloride and benzol together to give a long aliphatic chain with cyclic nuclei at various intervals in the chain or this compound may be alkylated as described in co-pending application of Mikeska and Fulton, Serial No. 674,519, filed June 6, 1933.

The resulting polymer will be colorless or substantially so if a colorless purified raw material is used, such as isobutylene. This polymer is very stable under ordinary conditions and does not show a tendency to deteriorate or harden with age as do other materials which have been used in the past and which have had, in general, a fairly high content of unsaturated linkages.

Although it is not desired to limit the invention by any theories as to its operation, the general type of structure which is believed responsible for the operation of the invention is considered to be a long chain hydrocarbon polymer having alkyl or aryl side chains. These may be built up by progressive polymerization of substituted unsymmetrical alpha olefines and also ring compounds such as indene, in which the double bond acts similarly to an alpha olefine linkage.

The same type of product may also be secured by hydrogenation, limited destructive hydrogenation, etc. of unsaturated polymers of suitably high molecular weight such as rubber.

In carrying out the invention, after the desired polymer has been formed, it may be thinned out to the desired degree with any suitable volatile solvent or non-volatile diluent such as oil, petrolatum, and the like. Other materials such as perfume, color, and the like, may also be blended with it in order to impart certain desired characteristics. Furthermore, if it is desired to apply the adhesive to porous or fibrous material such as cloth, paper, or wood, without having appreciable penetration of the adhesive fluid into the fibers, the polymer is diluted with a major proportion of solvent such as petroleum naphtha and this solution is used to swell a flexible colloidal material such as rubber or the like. This process and the products thereof are claimed in my co-pending application Serial No. 704,747 entitled "Coating compositions and methods of making same." Such a procedure is of advantage in preparing laminated products where, for example, the side of the paper opposite from that to which the foil is attached is to be coated with a material which will not adhere to a waterproofed paper. A typical example of such a product which is thus made possible is a gummed paper-foil tape used for fastening envelopes and packages.

In using the polymer adhesive, the solution prepared as above is applied to the surfaces to be coated, either by brush, spray, roll, immersion, or any other suitable means. This may be followed by pressing the surfaces together if desired, such as by passing through a pair of rolls or pressing between two flat surfaces. If the adhesive is applied in a thick consistency it may be warmed for application and subsequently cooled.

Owing to the great advantages of flexibility and tenacious adherence, polymerized hydrocarbon adhesives prepared according to the methods described above find a great many commercial uses. One particular use is for making metal foil products such as obtained by coating any rigid or flexible base with a foil made of aluminum, tin, steel, gold, etc., or various alloys. The invention has been found particularly applicable to the preparation of aluminum foil products, as aluminum, especially a polished aluminum surface, has a characteristic property which prevents most of the common adhesives from adhering to it and such adhesives as do adhere to the aluminum foil are generally not entirely satisfactory for other reasons such as tendency to deteriorate or become brittle. The foil may be of any desired thickness and may have various degrees of polish, hardness, texture (mottled, embossed, etc.), or form (sheet, stencil, silhouette, etc.), and on the exposed side it may have printing or design or color as desired. Also, to increase its stability against oxidation, the metal foil may be given a preliminary oxide coating by any suitable method such as by exposing either one or both sides to an oxidizing fluid. The foil may also be coated with lacquer.

The base to which such a metal foil may be applied may be any suitable material such as fibre board, paper, cloth, metal, wood, stone, concrete, glass, enamel, etc. As stated previously, the invention is particularly applicable to flexible laminated products such as paper or cloth coated with metal foil. It is also particularly useful in combining metal foil with a waterproofed paper, such as paper coated or impregnated with wax, because ordinary adhesives will not stick well to such a waterproofed paper.

Laminated products may be prepared with any number of laminations such as, for example, a layer of metal foil between two layers of cloth or paper. Such a composite product is very useful as "building paper" which is used in laying floors, etc. in order to make them resistant to moisture, dust, insects or vermin, and so-called "dry rot" which attacks the wood. Another laminated product containing the same materials, only in reverse order, i. e., having two layers of metal foil with an intermediate layer of cloth, has also a number of advantages owing to the strength and flexibility of the cloth combined with the properties of the metal foil which make the composite product impervious to gas, liquids, or moisture while at the same time maintaining suitable flexibility. In such a case the adhesive also serves to insure the desired imperviousness. Such a product finds particular adaptation as a material for making curtains such as for the home or for store windows or theatres, and also as window shades for the home or for trains, automobiles, etc. Such a material can also be used to advantage in aviation for covering of wings, fuselage, and the like, or as a balloon fabric in making dirigible balloons.

Instead of making the triple layer laminated products, the two layer products also find many uses. For example, a foil-coated paper can be used very satisfactorily as a wall paper or as wrapping paper (such as for candy and various other packages), or for pipe insulation, roofing paper, and many decorative products such as a foil-coated blotter paper, etc. Similarly a cloth coated with metal foil can be used for making fancy wearing apparel such as coats, dresses, hats, etc., or for making book covers, waterproofed bags, tanks, etc., or for various uses where it is desired to reflect light rays such as making automobile tops, awnings, parasols, and the like.

Owing to their good adhesive properties and at the same time fairly high dielectric strength, these polymerized hydrocarbon adhesives may also find particular adaptation in making electrical condensers such as those used for radio. In such a case they would serve as a substitute for the paraffin wax used heretofore. They may of course be blended with paraffin wax in order to impart some of their desirable adhesive characteristics thereto.

Instead of using metal foil, it may also be desirable at times to use finely divided metal such as aluminum powder and the like, in which case the material to be coated may first be given a thin coating of adhesive and then dusted or sprayed with the aluminum powder which may then be pressed onto the surface by any suitable means such as rolling, and the excess powder may be removed by blowing it away with an air blast or by brushing.

The accompanying drawing illustrates seven different embodiments of the invention as applied to different types of products. In all of the figures, parts of the coated product are shown either cut away or turned back so as to reveal the construction of the product, showing a section through the adhesive. The relative thickness of the layers is immaterial but the individual layers are exaggerated in thickness in the drawing for the sake of clearness. Fig. 1 illustrates a rigid base, such as wood, coated with metal foil; Fig. 2 shows a flexible base similarly coated; Fig. 3 shows a two-layer composite product of paper and metal foil joined by the preferred polymerized hydrocarbon adhesive; Fig. 4 illustrates a double layer of aluminum foil with an intermediate layer of cloth; Fig. 5 shows the reverse construction, i.e., a double layer of paper with an intermediate layer of metal foil; Fig. 6 shows an aluminum powder-coated paper and Fig. 7 illustrates a roll of metal foil-covered gummed tape.

It is not intended that the invention be limited to any of the particular examples given nor illustrations shown nor any of the theories advanced for the operation of the invention but it is desired to claim all inherent novelty as broadly as the prior art permits.

I claim:

1. A gummed paper tape comprising a layer of metal foil and a layer of gummed paper, said layers being held together by a substantially colorless polymerized hydrocarbon adhesive having non-hardening and plastic properties and comprising essentially polymerized isobutylene having a molecular weight between the approximate limits of 4,000 and 15,000.

2. A metal coated product comprising a fibrous base having a metal coating united thereto by an intermediate substantially colorless adhesive having non-hardening and plastic properties, said adhesive comprising essentially polymerized isobutylene having a molecular weight above about 1,000.

3. A product according to claim 2, in which the adhesive comprises essentially polymerized isobutylene having a molecular weight between the approximate limits of 4,000 and 15,000.

4. A laminated product comprising a flexible fibrous layer, a metal foil, and an intermediate substantially colorless adhesive having non-hardening and plastic properties, said adhesive comprising essentially polymerized isobutylene having a molecular weight above about 1,000.

5. A product according to claim 4, in which said metal foil is aluminum foil.

6. A product according to claim 4, in which the flexible fibrous base is a fibrous material selected from the group consisting of paper and cloth.

7. An improved laminated sheet material comprising a metal layer and a fibrous sheet held together by an intermediate tough, plastic, and flexible adhesive which does not appreciably penetrate into said fibrous sheet, said adhesive comprising non-volatile components of a coating composition comprising essentially isobutylene polymers having molecular weights above 1,000 and rubber.

8. A product as described in claim 7, in which said coating composition comprises a flexible colloidal rubber swelled by a liquid solution of the isobutylene polymers in a volatile hydrocarbon solvent.

9. A coated metal product comprising a metal base and a fibrous layer united thereto by the flexible adhesive coating comprising essentially iso-mono-olefin linear chain polymers having molecular weights above 1,000.

10. A product as described in claim 9, in which said linear chain polymers are polymers of isobutylene.

11. An improved moisture-proof, gas-proof, flexible laminated sheet material comprising a paper sheet united to a flexible metal layer by an adhesive comprising essentially linear chain polymers of an iso-mono-olefin, said polymers having molecular weights above 1,000.

12. The product as described in claim 11, in which said adhesive comprises a wax and in which said polymers are polymers of isobutylene.

13. A product as described in claim 11, in which said paper sheet is a water-proof paper.

14. In an improved window shade comprising at least one layer of aluminum foil and a layer of cloth held together by an adhesive, the improvement which consists in holding said layers together by a substantially colorless, age-resisting plastic adhesive which comprises essentially polymerized isobutylene having a molecular weight above 4,000.

WILLIAM H. SMYERS.